(12) United States Patent
Golden et al.

(10) Patent No.: US 7,703,604 B2
(45) Date of Patent: Apr. 27, 2010

(54) PACKAGE FOR DISCS

(76) Inventors: Ken Golden, 80 Powder Mill Rd., Morris Plains, NJ (US) 07950; Andrew Napolitane, 350 E. 52$^{nd}$ St., Apt. 12G, New York, NY (US) 10022

( * ) Notice: Subject to any disclaimer, the term of this patent is extended or adjusted under 35 U.S.C. 154(b) by 262 days.

(21) Appl. No.: 11/510,004

(22) Filed: Aug. 25, 2006

(65) Prior Publication Data

US 2008/0047854 A1 Feb. 28, 2008

(51) Int. Cl.
| | |
|---|---|
| B65D 85/57 | (2006.01) |
| B65D 69/00 | (2006.01) |
| B65D 85/30 | (2006.01) |
| B65D 71/00 | (2006.01) |

(52) U.S. Cl. .................... 206/312; 206/308.1; 206/232; 206/813

(58) Field of Classification Search ............. 206/308.1, 206/308.3, 311–313, 232, 307, 307.1, 806, 206/813; 229/72; 40/789, 751, 124.13
See application file for complete search history.

(56) References Cited

U.S. PATENT DOCUMENTS

| | | | |
|---|---|---|---|
| 4,700,833 A | 10/1987 | Smith | |
| 5,085,318 A | 2/1992 | Leverick | |
| 5,188,229 A * | 2/1993 | Bernstein | 206/308.1 |
| 5,199,743 A | 4/1993 | Rosinski, III | |
| 5,318,222 A | 6/1994 | Bartlett | |
| 5,460,265 A | 10/1995 | Kiolbasa | |
| 5,692,607 A * | 12/1997 | Brosmith et al. | 206/308.1 |
| 5,836,507 A | 11/1998 | Mueller et al. | |
| 6,016,907 A | 1/2000 | Dreier | |
| 6,059,101 A | 5/2000 | Gambardella et al. | |
| 6,241,085 B1 * | 6/2001 | Koehn | 206/308.1 |
| 6,298,985 B1 | 10/2001 | Mathias | |
| 6,634,495 B2 * | 10/2003 | Hass | 206/312 |
| 6,681,929 B2 * | 1/2004 | Bergh et al. | 206/308.1 |
| 6,845,865 B2 | 1/2005 | Wynalda, Jr. et al. | |
| 6,926,140 B2 | 8/2005 | Bergh et al. | |
| 6,938,759 B2 | 9/2005 | Golden et al. | |
| 6,981,587 B2 | 1/2006 | Gerrie | |
| 7,147,397 B2 | 12/2006 | Polk | |
| 2001/0037951 A1 | 11/2001 | Garnier | |
| 2002/0134694 A1 | 9/2002 | Cherng | |
| 2003/0111368 A1 | 6/2003 | Wynalda, Jr. et al. | |
| 2004/0069661 A1 | 4/2004 | Telleen | |
| 2004/0118714 A1 * | 6/2004 | Golden et al. | 206/308.1 |
| 2005/0029136 A1 | 2/2005 | Gerrie | |
| 2005/0279658 A1 | 12/2005 | Bergh et al. | |

* cited by examiner

*Primary Examiner*—Mickey Yu
*Assistant Examiner*—Melissa L Lalli
(74) *Attorney, Agent, or Firm*—Hedman & Costigan, P.C.

(57) ABSTRACT

A package for storing and/or shipping discs has at least one section with a first panel, a second panel and at least one intermediate panel, the intermediate panel being positioned between the first panel and the second panel, where the first and second panels each include at least one opening for receiving a disc and the intermediate panel is solid in at least the area between the first and second panels below the openings where the discs are inserted. The package includes a fastener between the second panel and the intermediate panel positioned above the disc receiving opening on the second panel and a fastener between the first panel and the intermediate panel at a terminal edge of the first panel above the disc receiving opening on the first panel.

11 Claims, 5 Drawing Sheets

PACKAGE FOR DISCS

FIELD OF THE INVENTION

The present invention relates to the field of packaging, and more particularly to a package for discs in which at least one section of the package includes panels for accepting discs on opposed sides.

BACKGROUND OF THE INVENTION

Removable data storage media including floppy discs and the like, are used for recording and playing back data such as audio, video and computer related or machine-readable data. Recent advances in technology have dramatically increased their data storage capacity, while reducing their overall physical dimensions and weight. Optical discs are one type of data storage media which utilize optical technology for managing and storing data. Optical discs are available in several formats including, but not limited to, minidisks, compact discs ("CDs"), digital video discs ("DVDs") and the like. Their large data storage capacity and compact size have made optical discs highly preferred over other types of data storage media including magnetic recording tape. The performance of these optical discs, however, can be adversely affected by minor distortions in the disc surface cause by abrasions, debris, cracks and the like. Such distortions can cause data loss or degradation in the affected optical disc.

To minimize data loss and physical damage, optical discs are typically packaged in rigid plastic containers or boxes. However, such containers are usually bulky, heavy, and prone to breakage. Other optical disc are packaged in flimsy paper sleeves that provide little or no protection against physical damage from impact or stress, or must be placed into bulky packing made from stiff paper or paperboard in order to reinforce the packaging.

Accordingly, there is a need for a package that can provide convenient and economical storage and display of discs such as optical data storage media (e.g., CDs, minidisks, DVDs and the like) that can be easily formed from a unitary blank, preferably from a rigid, foldable material.

A package that has helped fill this need is shown and described in U.S. Pat. No. 6,938,759. However, the package described therein utilizes a complex arrangement with slots and flaps interior to the opening for receiving the discs, requiring a number of cuts and perforations in the blank. Additionally, although the arrangement avoids contact of two opposed discs at the point that the second disc is being inserted, the fully inserted opposed discs can contact each other.

There is therefore a further need for a package for storing discs that is more efficient to manufacture, easier to use and friendly to the environment which has the capability of storing the discs in back to back relationship for enhanced functionality.

SUMMARY OF THE INVENTION

The present invention is directed generally to a package for carrying, shipping and/or storing two or more discs. The package of the present invention is convenient and inexpensive to make and use, while providing convenient packaging and display, and enhanced disc storing capacity. The present package may be operatively implemented into compact form for efficient carrying, shipping or storage, or into an open form for providing and attractive display or retrieval of the discs packaged therein. The present package may be conveniently fabricated from a unitary blank composed of a rigid and foldable material such as paperboard. The package of the present inventions is further constructed in a manner that makes it especially suitable for use in consumer packaging.

In keeping, the present invention is directed to a package for discs which comprises at least one section having a first panel, a second panel and at least one intermediate panel, the intermediate panel being positioned between the first panel and the second panel, where the first and second panels each include at least one opening for receiving a disc and said intermediate panel is solid in at least the area between the first and second panels below the openings where the discs are inserted. The package includes a fastener between the second panel and the intermediate panel positioned above the disc receiving opening on the second panel and a fastener between the first panel and the intermediate panel at a terminal edge of the first panel above the disc receiving opening on the first panel.

In a preferred embodiment, the first, second and intermediate panels are integrally formed in a folded configuration. Most preferably, the first and second panels are integrally connected adjacent each other and the intermediate panel is integrally connected to second panel.

The fastener can be any suitable means for fastening the panels in an attached configuration, including adhesives, staples, snaps, Velcro, rivets, pins, catches, or the like. Preferred, however, are adhesives, with permanent adhesives being most preferred.

It is preferred that the present invention a plurality of sections operatively engaged to one another. Preferably, the adjacent sections are operatively engaged by hinges, comprising hinge portions between adjacent sections, which allow adjacent sections to be folded over one another.

When a section has a free end, either being a single section with free ends on both sides or being one of a plurality of sections with an adjacent section on only one side and a free end on the other side, it is preferred that one or more additional fasteners be used at the free ends. The additional fasteners are preferably formed in the area of the corner of the first panel, the second panel and/or the intermediate panel below the disc openings and against the free end so as not to interfere with a disc seated within the disc opening. The fastener at the free end can be in the form of a single fastener, such as a staple engaging each of the first, second and/or intermediate panels, or as complimentary fasteners, such as an adhesive between the first panel and the intermediate panel and an adhesive between the second panel and the intermediate panel.

BRIEF DESCRIPTION OF THE DRAWINGS

The present invention will be better understood when considered in view of the attached drawings, in which like reference characters indicate like parts. The drawings, however, are presented merely to illustrate the preferred embodiment of the invention without limiting the invention in any manner whatsoever.

DETAILED DESCRIPTION OF THE PREFERRED EMBODIMENT

The present invention is generally directed to a package which can be used to accommodate two or more discs for convenient storage and display. The package of the present invention is constructed with the advantage of improved durability and enhanced disc holding capacity, while possessing minimal component parts and packaging material. The package of the present invention is adapted to protect the discs stored therein from damage such as by heat, chemicals, abrasions, contact with potentially damaging materials and the like. In addition, the package of the present invention may also be constructed in a manner which allows the user to manipulate the present package into a compact form required for convenient use, or into and open form to provide an attractive display or enable ready access to the discs contained therein. The cost effective and efficient manner by which these units are constructed and by which the package of the present invention can be used for packaging and storing disc including optical storage media (e.g., CDs, minidisks, DVDs and the like) makes them especially suitable for consumer packaging use.

In accordance with one aspect of the present invention, the package generally comprises at least one section with a first panel, a second panel and at least one intermediate panel, the intermediate panel being positioned between the first panel and the second panel, where the first and second panels each include at least one opening for receiving a disc and said intermediate panel is solid in at least the area between the first and second panels below the openings where the discs are retained. The package includes a fastener between the second panel and the intermediate panel positioned above the disc receiving opening on the second panel and a fastener between the first panel and the intermediate panel at a terminal edge of the first panel above the disc receiving opening on the first panel.

The intermediate panel(s) enhances the structural strength of the package and eliminates contact between the discs inserted through the first and second openings, respectively.

The package of the present invention may be configured to include a single section designed to accommodate at least two discs, or two or more sections that may be foldably connected to one another in a suitable manner to accommodate a desired number of discs. The package of the present invention may further include additional sections which may comprise single disc holding capacity. The package of the present invention may be fabricated form a unitary blank formed form a rigid, foldable and resilient sheet material including, but not limited, to paperboard.

Figure 1:
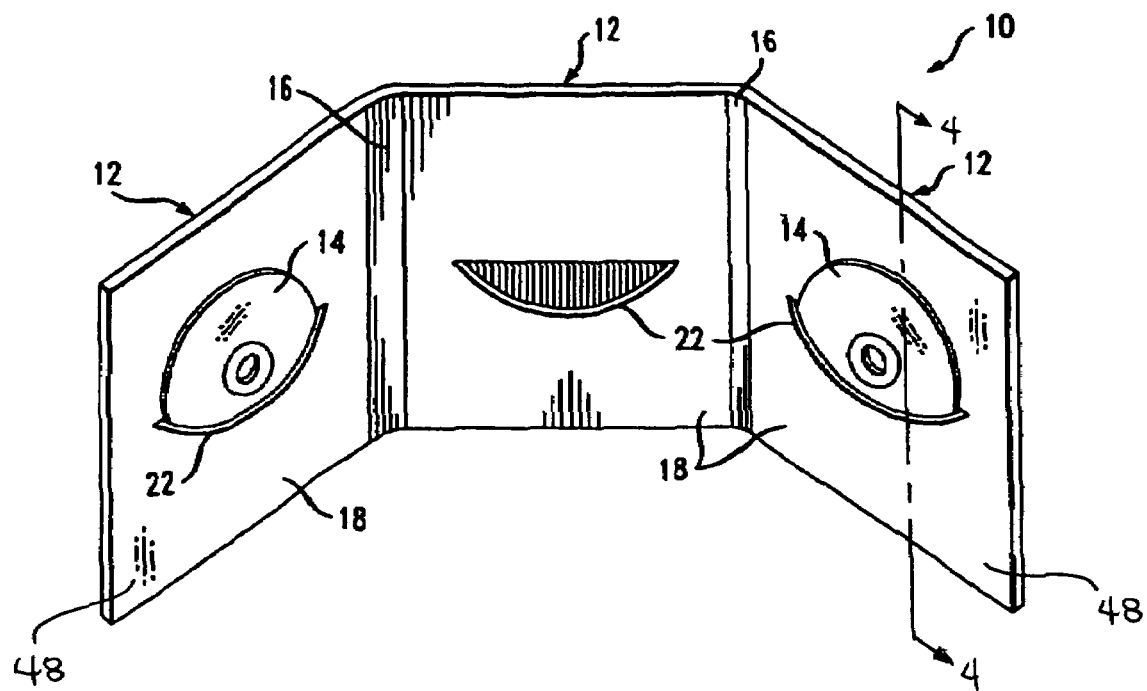
FIG. 1 is a front perspective view of a package having three disc holding sections according to one embodiment of the present invention.
Figure 2:
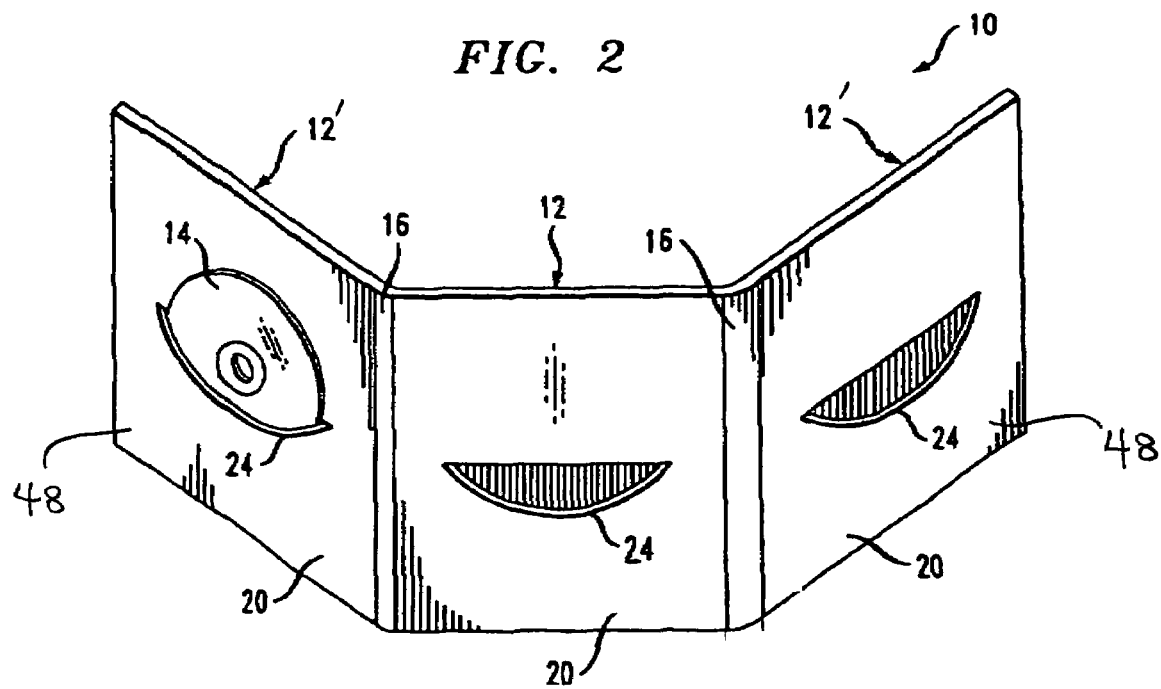
FIG. 2 is a rear perspective view of the package of FIG. 1.

Referring to FIGS. 1 and 2, a package 10 for carrying, shipping and/or storing two or more discs is shown for one embodiment of the present invention. The package 10 comprises three disc holding sections 12, each adapted to hold at least one disc 14, and each foldably connected to an adjacent section 12 by a portion 16, preferably hingedly connected, to yield an arrangement in which adjacent sections 12 may be folded upon one another. Each disc holding section 12 of the package 10 includes front and rear sides. The front and rear sides may each be adapted to hold a disc 14, thereby enhancing the disc holding capacity of the package 10. It will be understood that the front and rear sides may each be further adapted to accommodate more than one disc as described hereinbelow.

The package 10, if a hinged portion 16 is employed, may be manipulated into an open form (as shown in FIGS. 1 and 2), or into a compact form with adjacent sections 12 folded upon one another. In the compact form, the sections 12 of the package 10 may be folded at the hinge portions 16 to cause the front and rear sides thereof to abuttingly contact one another in juxtaposition to yield a stacked arrangement. The package 10 with the stacked arrangement of sections 12 may thereafter be optionally packaged in a box or a wrap material such as cellophane. It will be understood that the package of the present invention may be folded in any configuration depending in the number of the sections 12 and the construction of the hinge portions 16 of the package 10 of the present invention.

It will be understood that although the present embodiment of the package 10 is shown having three sections 12 successively connected to one another, the present invention is not limited to such arrangement, and may include other arrangements comprising a single section 12 or two or more sections 12 connected to one another.

As shown in FIGS. 1 and 2, each disc holding section 12 includes a front panel 18 and a rear panel 20. One or more of the front and rear panels 18 and 20 may each include disc receiving openings 22 and 24, respectively, each adapted for removably receiving a portion of the disc 14, suitably positioned on the front and rear panels 18 and 20, respectively. The disc receiving openings 22 and 24 are each adapted for removably receiving a portion of the disc 14 and may be suitably positioned on the front and rear panels 18 and 20, respectively, to securely retain a portion of the discs 14. It will be understood that the number, size and shape of the openings and the disc holding sections of the package of the present invention may be modified as necessary to accommodate a desired number or size of discs 14 for convenient packaging. For example, each section may include a single opening to accommodate one disc, opposed dual openings to accommodate two discs, or more than two openings to accommodate the corresponding number of disc as desired.

Optionally, the surface of the front or rear panels 18 or 20 may be printed or applied with indicia to provide the package 10 with a visually attractive appearance or display.

Figure 4:
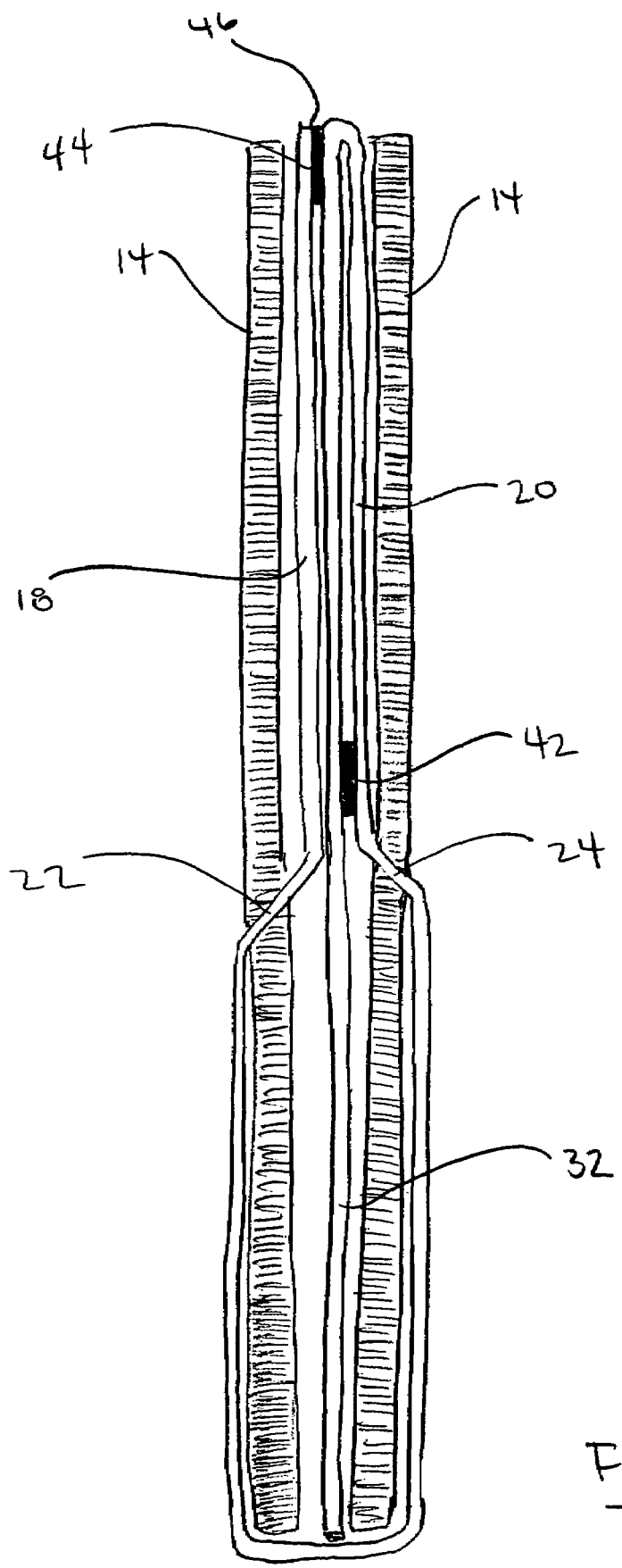
FIG. 4 is a side elevation cross section of the package of the present invention taken along lines 4-4 of FIG. 1.
Figure 5A:
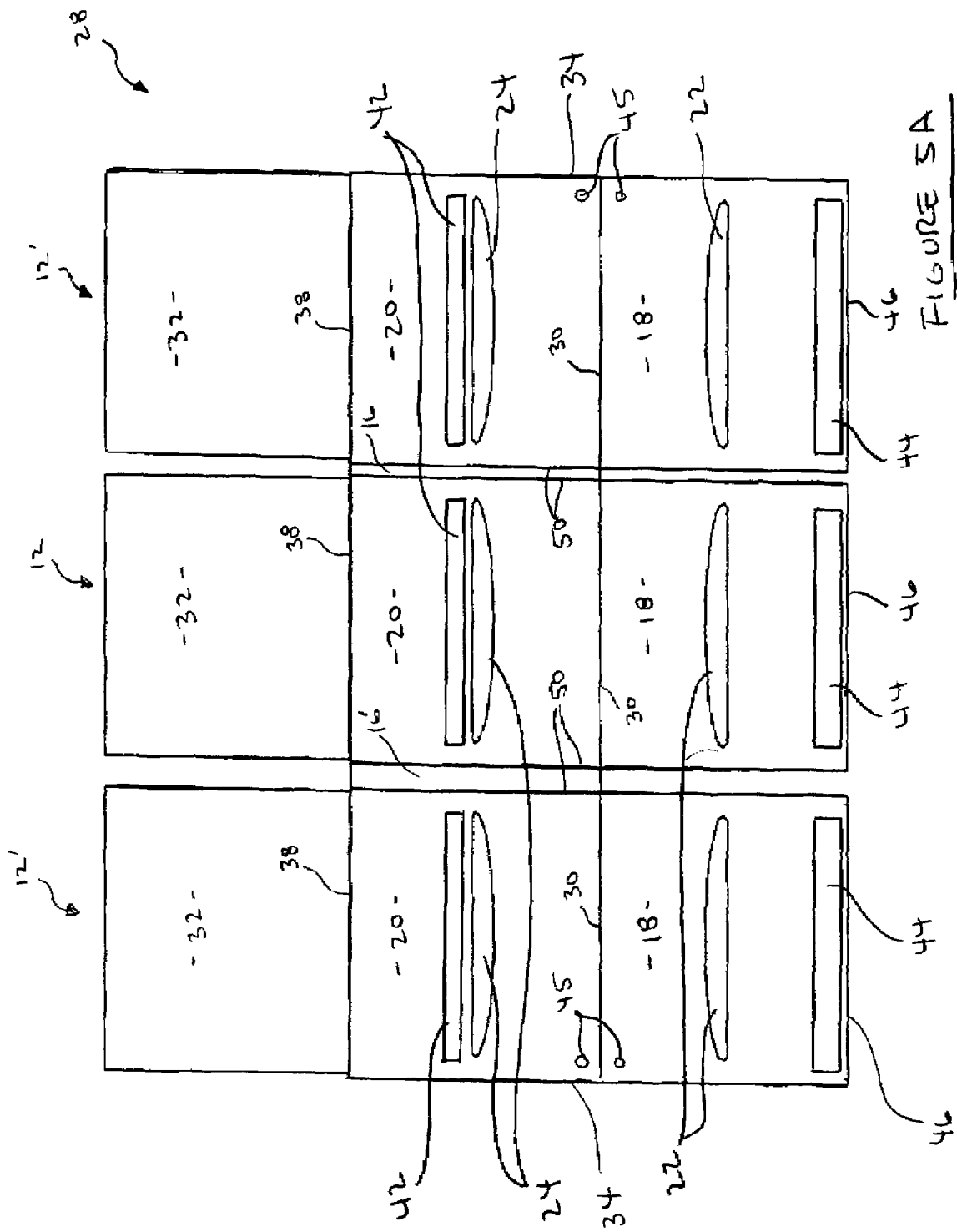
FIG. 5A is an elevation of a blank for forming the package of FIG. 1 in accordance with the present invention.
Figure 5B:
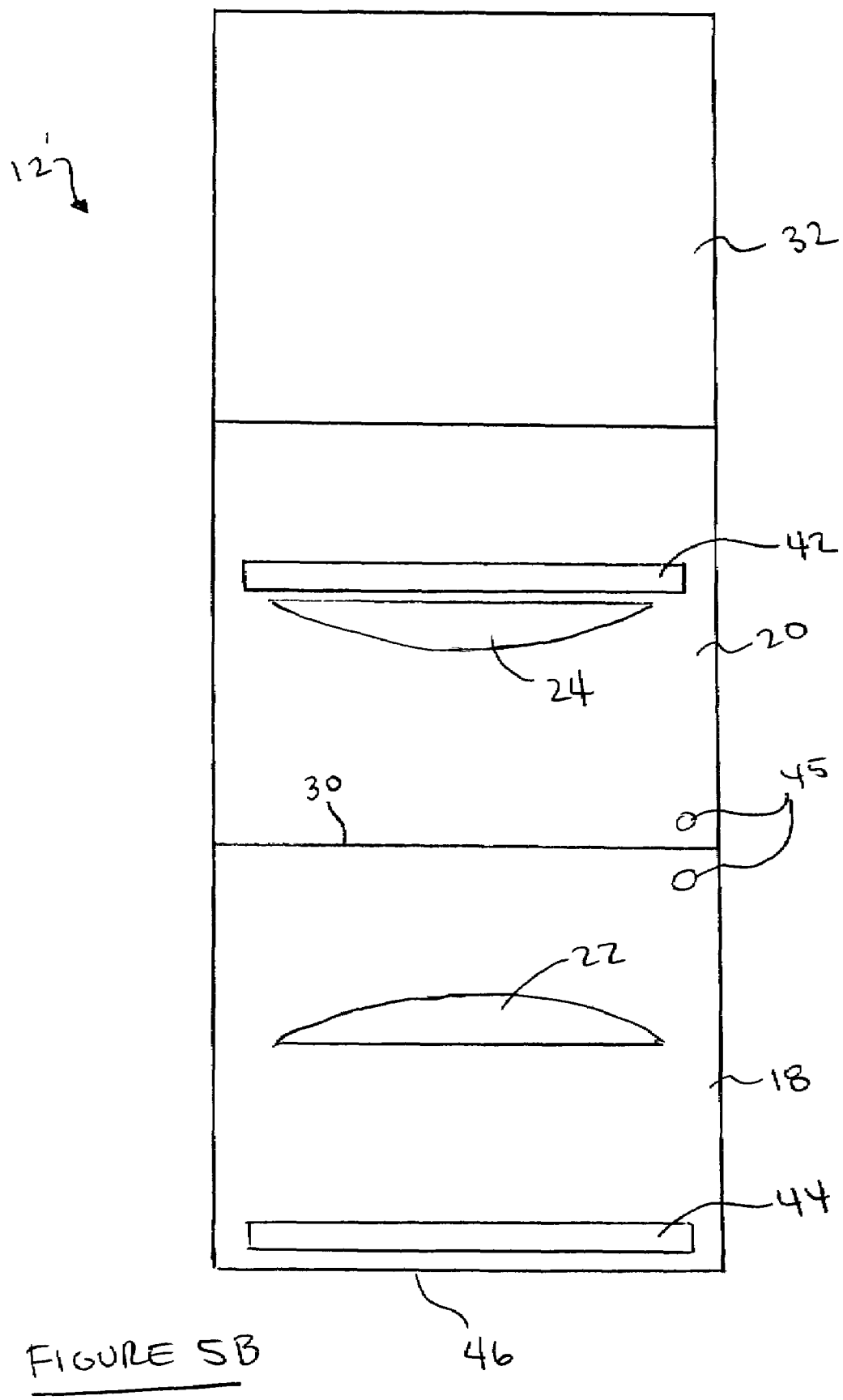
FIG. 5B is an elevation of a portion of the blank of FIG. 5A for forming a section of the package in accordance with the present invention.

Each disc holding section 12 further comprises an intermediate panel 32, as best shown in FIGS. 4, 5A and 5B. The intermediate panel 32 creates a partition between two discs 14 inserted into the disc openings 22 and 24 on the front panel 18 and rear panel 20 of each section 12. The intermediate panel 32 is therefore substantially solid in at least the area between the front and rear panels 18 and 20 below the disc receiving openings 22 and 24, where the discs 14 are retained.

Figure 3:
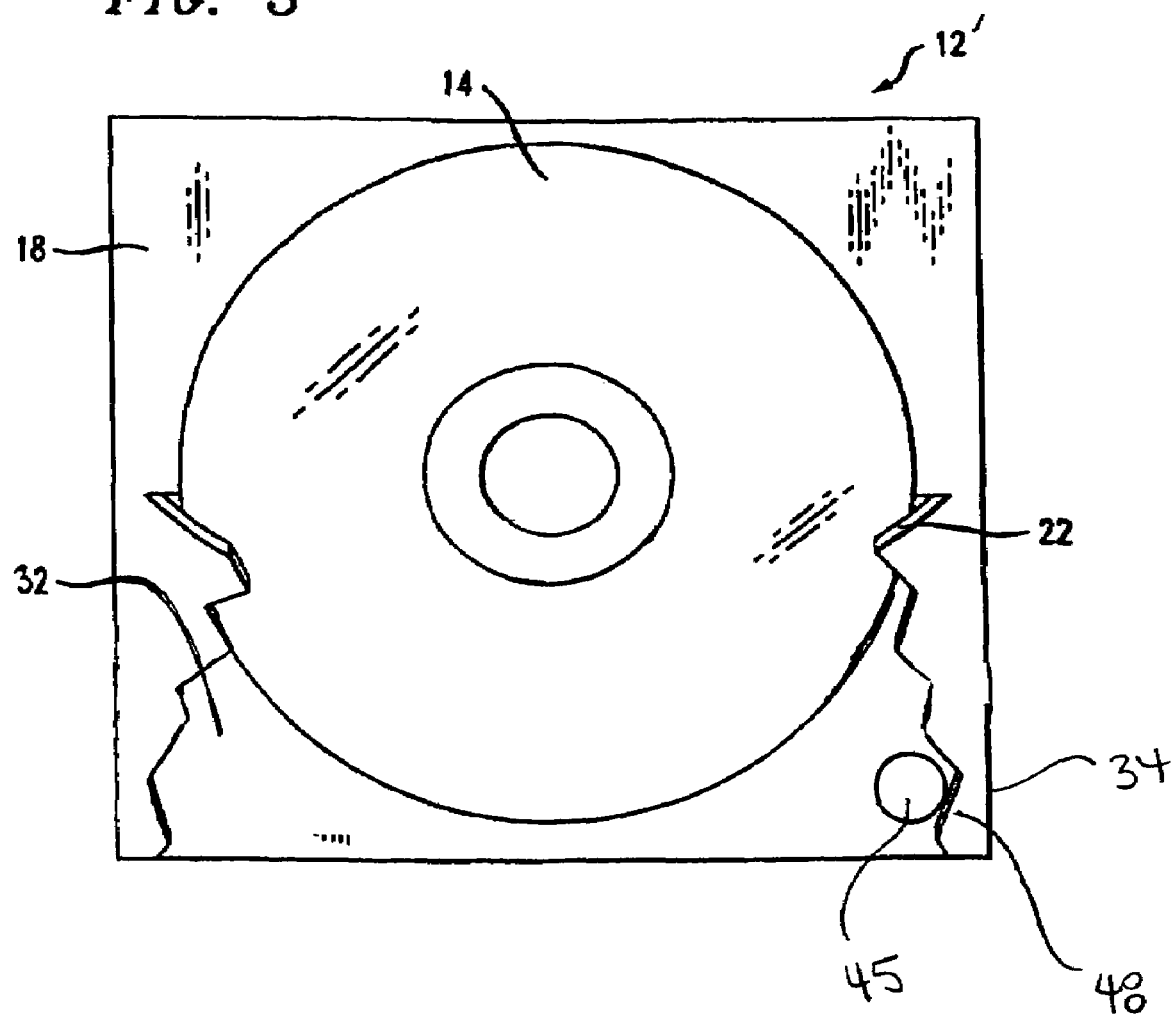
FIG. 3 is a front elevation of a section of the package of the present invention shown partially cut away with a disc retained therein.

With reference to FIG. 3, the section 12 of the package 10 is shown with a portion of the front panel 18 removed to illustrate the placement of a disc 14 through the opening 22 and into the area against the intermediate panel 32 where the disc 14 is retained. The intermediate panel 32 of the section 12 separates the discs 14 from one another (as best shown in FIG. 4). This prevents the discs 14 from contacting one another when inserted through the openings 22 and 24 positioned in the front and rear panels 18 and 20, respectively, and retained in the section 10. By preventing the discs 14 from contacting one another, abrasions, scratches or other surface damage to the discs 14 are prevented.

The intermediate panel 32, in cooperation with the front and rear panels 18 and 20, respectively, also maintains secure retention of the disc 14 through frictional and mechanical pressure, and prevents the discs 14 from being inadvertently discharged from the openings 22 and 24. It also provides structural rigidity and support to the section 12, especially when the intermediate panel 32 is substantially the same height as the front and rear panels 18 and 20 as in the accompanying drawings.

With reference to FIG. 4, an exploded cross sectional side view of the section 12 of the package of the present invention is shown to illustrate the arrangement of the disc 14 contained therein. The section 12 is shown in a laterally expanded state to show in better detail the respective components of the present invention. The components forming the section 12 are held together by the use of suitable fastening or connecting means including adhesives or mechanical fasteners, for example, as will be described hereinafter. The front and rear panels 18 and 20 are foldably arranged against one another with the intermediate panel 32 foldably arranged therebetween in a tri-fold configuration.

The components are held together by adhesive strips 42 and 44, and optionally an adhesive point 45 at the free ends of the package 10. In particular, the rear panel 20 is secured to the intermediate panel 32 at a position above the disc receiving opening 24 and the front panel 18 is secured to the intermediate panel 32 at a position along the terminal end 46 of the front panel 18. Of course, it is possible to use a single fastener through the front, rear and intermediate panels 18, 20 and 32 as both the fastener between the front panel 18 and intermediate panel 32 and the fastener between the rear panel 20 and the intermediate panel 32. Optionally, the front, rear and intermediate panels 18, 20 and 32 are also secured at the corner 48 below the disc openings 22 and 24 on the front and rear panels 18 and 20 against the free ends 34 to of laterally outward sections 12' to yield an integral and relatively rigid and compact structure.

As shown in FIGS. 4, 5A and 5B, an adhesive strip 42 is placed between the rear panel 20 and the intermediate panel 32 positioned above the disc receiving opening 24 on the rear panel. An adhesive strip 44 is placed between the front panel 18 and the intermediate panel 32 at the terminal end 46 of the front panel 18.

In the preferred embodiment shown in FIGS. 3 and 5A, the laterally outward sections 12' that do not connect to an adjacent section 10 further include a fastener 45 at the corner 48 of the front panel 18, the rear panel 20 and the intermediate panel 32 below the disc openings and against the free end 34. The fastener 45 shown in the drawings is an adhesive which can be placed on the blank 28 on the front and rear panels 18 and 20, so that when the blank 28 is folded the front, rear and intermediate panels 18, 20 and 32 are fastened at the corner 48 along the free end 34 below the disc openings 22 and 24.

As described above, the front and rear panels 18 and 20 may include openings 22 and 24, respectively, for permitting passage of a portion of the discs 14 into the area between the front panel 18 and the intermediate panel 32 or between the rear panel 20 and the intermediate panel 32. The intermediate panel 32 prevents the discs 14 from contacting one another as one or both of the discs 14 are inserted through the respective openings 22 and 24, while enhancing the structural rigidity of the section 12. Additional panels (not shown) may be included to cover a disc inserted into the front and/or rear panel 18 and/or 20.

With reference to FIG. 5A, a unitary black 28 from which the package 10 is formed is shown for one embodiment of the present invention. The blank 28 comprises three rear panels 20, foldably attached to each other by the respective hinge portions 16 along respective fold lines 50; three front panels 18 each foldably connected to the respective rear panels 20 along respective fold lines 30; and three intermediate panels 32 each foldably connected to the respective rear panels 20 along respective fold lines 38. Each of the front panels 18, rear panels 20 and intermediate panels 32 that are integrally connected to one another, in combination, form an individual section 12 of the package 10 described herein. It is understood that the blank 28 may be modified to vary the number of the connected front, rear, and intermediate panels 18, 20 and 32 to form the desired number of sections 12 in the package 10 of the present invention.

Each of the front panels 18 optionally includes a disc receiving opening 22 and each of the rear panels 20 optionally includes a disc receiving opening 24. Although the embodiment shown includes disc openings 22 and 24 on each of the front and rear panels 18 and 20, respectively, it is understood that not each of the front and rear panels 18 and 20 includes a disc opening 22 and 24.

It will be further understood that the blank 28 may be formed from a unitary rigid, foldable sheet material. The outer perimeter, cutouts for the disc openings 22 and 24, and fold lines 30, 38, and 50 are all preferably stamped or otherwise cut from the blank 28 using conventional blank making techniques known in the art.

Adhesive may be applied to the blank 28 at areas 42, 44 and 45 where indicated for fastening and maintaining the structure of the package 10. The blank 28 is folded and adhered together to form the package 10 as described herein. Alternatively, the package 10 may be folded and fastened together by suitable mechanical fasteners such as, for example, staples, snaps, rivets, Velcro, pins, etc., as known in the art.

A portion of the blank 28 corresponding to a section 12' of the package 10 is shown in FIG. 5B to illustrate the basic components for forming the disc holding section 12 of the package 10. The section 12' of the package 10 may be readily formed from the blank portion 28 by folding the intermediate panel 32 onto the rear panel 20, where adhesives 42 and 45 of the rear panel 20 contact and adhere to corresponding portions of the intermediate panel 32. The front panel 18 is then folded over onto the respective intermediate panel 32 where adhesives 44 and 45 of the front panel 18 contact and adhere to corresponding portions of the intermediate panel 32. This folding operation may be repeated for each blank portion for forming a section 12 of the package 10, however, it is understood that interior ends preferably do not include the adhesive 45 on either the front panel 18 or the rear panel 20.

The dimensions for the various elements of the present invention will be easily arrived at by one skilled in the art. For example, in forming a package 10 for standard optical discs having the benefits of the preferred embodiment of the present invention, the blank 28 would have a total height of $14^{25}/_{32}$ inches, of which the front panel 18 would have a height of $4^{15}/_{16}$ inches, the rear panel 20 would have a height of $4^{31}/_{32}$ inches and the intermediate panel 32 would have a height of $4^{7}/_{8}$ inches. The blank 28 formed of three sections 12 would have a total width of $17^{13}/_{16}$ inches, of which the front and rear panels 18 and 20 would have a width of 5 and $^{11}/_{16}$ inches, the intermediate panel 32 would have a width of slightly less than $5^{11}/_{16}$ to avoid interference when the sections are folded, and the connecting hinges would have a width of just under $1/4$ inch at the first hinge connection 16 and $1/2$ inch at the second hinge connection 16' where the second hinge connection 16' closes over the two sections closed about the first hinge connection 16.

Variations, modifications and alterations to the preferred embodiment of the present invention described above will make themselves apparent to those skilled in the art. All such changes are intended to fall within the spirit and scope of the present invention, limited solely by the appended claims.

We claim:

1. A package for discs comprising at least one section comprising:
    a first panel, a second panel and at least one intermediate panel, the intermediate panel being positioned between the first panel and the second panel, said first and second panels each including at least one disc receiving opening for receiving discs and said intermediate panel being substantially solid in at least the area between the first and second panels below the disc receiving openings where the discs are retained to create a partition between discs inserted into the disc receiving openings, so that no portion of a disc received in a disc receiving opening can be received by or pass through the intermediate panel;
    a first fastener between the second panel and the intermediate panel positioned above the disc receiving opening on the second panel; and
    a second fastener between the first panel and the intermediate panel along a terminal edge of the first panel above the disc receiving opening on the first panel, where no panels are attached at the terminal edge of the first panel,
    wherein the section has at least one free end, where there is not an adjacent section, further comprising a fastener in the area of the corner of the first panel, the second panel and/or the intermediate panel below the disc openings and against the free end and further wherein the first panel is integral with the second panel at one end and the connection between the first panel and the second panel is a fold.

2. The package of claim 1 wherein the first, second and intermediate panels are integrally formed in a folded configuration.

3. The package of claim 1 wherein at least one of the first and second fastener is an adhesive.

4. The package of claim 1 wherein the section further comprises a hinge portion opposite the free end, the hinge portion connecting to an adjacent section.

5. A package for discs comprising a plurality of sections operatively connected to one another, each of said sections comprising:
    a first panel, a second panel and at least one intermediate panel, the intermediate panel being positioned between the first panel and the second panel, said first and second panels each including at least one disc receiving opening for receiving discs and said intermediate panel being substantially solid in at least the area between the first and second panels below the disc receiving openings where the discs are retained to create a partition between discs inserted into the disc receiving openings, so that no portion of a disc received in a disc receiving opening can be received by or pass through the intermediate panel;
    a first fastener between the second panel and the intermediate panel positioned above the disc receiving opening on the second panel; and
    a second fastener between the first panel and the intermediate panel along a terminal edge of the first panel above the disc receiving opening on the first panel, where no panels are attached at the terminal edge of the first panel,
    wherein at least two sections have at least one free end, where there is not an adjacent section, further comprising a fastener in the area of the corner of the first panel, the second panel and/or the intermediate panel below the disc openings and against the free end and further wherein the first panel is integral with the second panel at one end and the connection between the first panel and the second panel is a fold.

6. The package of claim 5 wherein the first, second and intermediate panels are integrally formed in a folded configuration.

7. The package of claim 5 wherein at least one of the first and second fastener is an adhesive.

8. The package of claim 5 wherein the plurality of sections are connected in juxtaposition to one another.

9. The package of claim 8 wherein the plurality of sections are hingedly connected.

10. The package of claim 8 wherein at least one section further comprises a hinge portion opposite a free end, the hinge portion connecting to an adjacent section.

11. The package of claim 5 wherein the plurality of sections is three or more.

* * * * *